United States Patent
Chiang et al.

(10) Patent No.: US 9,408,092 B2
(45) Date of Patent: Aug. 2, 2016

(54) RAN PERFORMANCE THROUGH DIGITAL SIGNAL PROCESSING BETWEEN BASEBAND UNIT AND REMOTE RADIO HEADS

(71) Applicant: Verizon Patent and Licensing Inc., Arlington, VA (US)

(72) Inventors: David Chiang, Fremont, CA (US); Thaddeus J. Dudziak, Pleasanton, CA (US); John F. Macias, Antelope, CA (US); Kent W. Hughes, Oakland, CA (US); Maria G. Lam, Oakland, CA (US); Mingxing S. Li, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 97 days.

(21) Appl. No.: 14/286,679

(22) Filed: May 23, 2014

(65) Prior Publication Data

US 2015/0341802 A1    Nov. 26, 2015

(51) Int. Cl.
| | |
|---|---|
| *H04W 24/02* | (2009.01) |
| *H04W 84/04* | (2009.01) |
| *H04W 24/08* | (2009.01) |
| *H04W 24/10* | (2009.01) |
| *H04B 17/27* | (2015.01) |
| *H04B 17/345* | (2015.01) |
| *H04B 17/12* | (2015.01) |
| *H04B 17/21* | (2015.01) |

(52) U.S. Cl.
CPC .............. *H04W 24/02* (2013.01); *H04B 17/12* (2015.01); *H04B 17/21* (2015.01); *H04B 17/27* (2015.01); *H04B 17/345* (2015.01); *H04W 24/08* (2013.01); *H04W 24/10* (2013.01); *H04W 84/042* (2013.01)

(58) Field of Classification Search
CPC ... H04W 24/02; H04W 84/042; H04W 24/08; H04W 24/10; H04W 88/08; H04W 88/085; H04B 17/12; H04B 17/21
USPC ......................................................... 455/561
See application file for complete search history.

(56) References Cited

U.S. PATENT DOCUMENTS

| | | | | |
|---|---|---|---|---|
| 5,872,814 | A * | 2/1999 | McMeekin ................... | 375/296 |
| 2010/0118921 | A1* | 5/2010 | Abdelmonem et al. ....... | 375/148 |
| 2012/0294162 | A1* | 11/2012 | Pajukoski et al. ............. | 370/252 |
| 2013/0272202 | A1* | 10/2013 | Stapleton et al. ............. | 370/328 |
| 2014/0094157 | A1* | 4/2014 | Nguyen et al. ................ | 455/418 |
| 2014/0204895 | A1* | 7/2014 | Frederiksen et al. .......... | 370/329 |
| 2014/0219122 | A1* | 8/2014 | Nakamura et al. ............ | 370/252 |
| 2014/0335879 | A1* | 11/2014 | Immendorf et al. .......... | 455/452.1 |

OTHER PUBLICATIONS

K. Watanabe and M. Machida, "Outdoor LTE Infrastructure Equipment (eNodeB)," Fujitsu Sci. Tech. J., vol. 48, No. 1, Jan. 2012 (available at http://www.fujitsu.com/downloads/MAG/vol48-1/paper11.pdf, visited May 23, 2014).

* cited by examiner

*Primary Examiner* — Brandon Miller (57) ABSTRACT

Digital signal processors (DSPs) process the digital baseband signals associated with CPRI links between BBUs and RRHs. The DSPs may be implemented at the RRH nodes (e.g., at the link leading to the BBU node), at the BBU node (e.g., at the links leading to the RRH nodes), or at both. The DSPs may be used to increase performance of the RAN. For example, the DSPs may implement digital filters designed to enhance the performance of the RAN.

20 Claims, 12 Drawing Sheets

| DSP ID | Data From DSP | DSP Corrective Actions |
|---|---|---|
| DSP100 | <spec1, spec2, ...> | <filter1>,<filter2> |
| DSP110 | <bandwidth> | <filter3> |
| ⋮ | ⋮ | ⋮ |

410 → DSP ID
420 → Data From DSP
430 → DSP Corrective Actions

RAN PERFORMANCE THROUGH DIGITAL SIGNAL PROCESSING BETWEEN BASEBAND UNIT AND REMOTE RADIO HEADS

BACKGROUND

Wireless user devices, such as mobile telephones, may connect to wireless networks (e.g., a cellular wireless network) via a radio access network ("RAN"). The RAN may include one or more base stations that may serve as the interface between the user devices and the wireless network.

In some RANs, a base station may include multiple remote radio head (RRH) nodes that connect to a baseband unit (BBU) that acts as a control node for the radio heads. The RRHs may be connected to the BBU using, for example, a high capacity optical fiber that connects the RRHs and the BBU. The interface (i.e., the optical fiber interface) between the RRHs and the BBU may communicate digital baseband signals and may be compliant with the common public radio interface (CPRI).

DETAILED DESCRIPTION OF PREFERRED EMBODIMENTS

The following detailed description refers to the accompanying drawings. The same reference numbers in different drawings may identify the same or similar elements.

Techniques described herein may use digital signal processors (DSPs) to process the digital baseband signals associated with CPRI links between BBUs and RRHs. The DSPs may be implemented at the RRH nodes (e.g., at the link leading to the BBU node), at the BBU node (e.g., at the links leading to the RRH nodes), or at both. The DSPs may be used to improve the performance of the RAN, such as by implementing digital filters or other signal processing techniques designed to remove interference and/or noise from the digital baseband signals or to otherwise enhance the performance of the RAN.

Figure 1A:
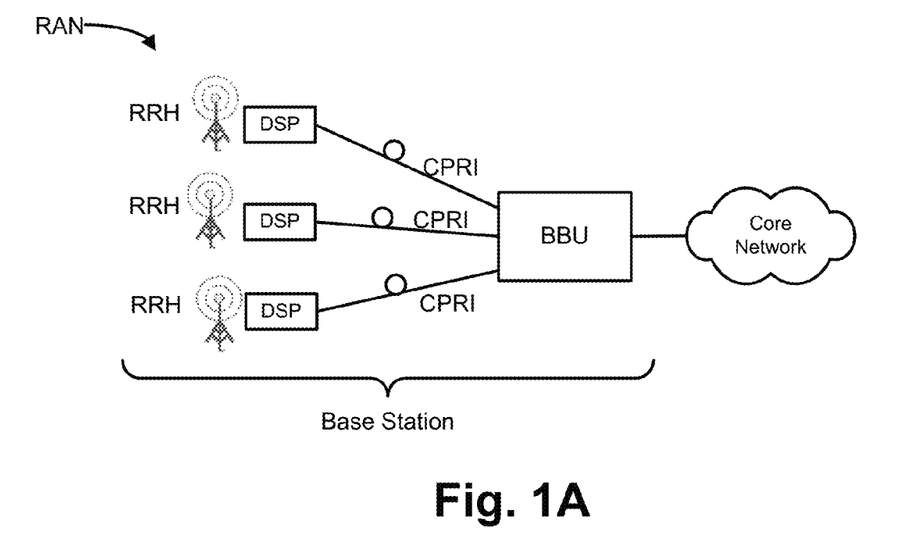
FIGS. 1A-1C are diagrams illustrating an example of overviews of concepts described herein.
Figure 1B:
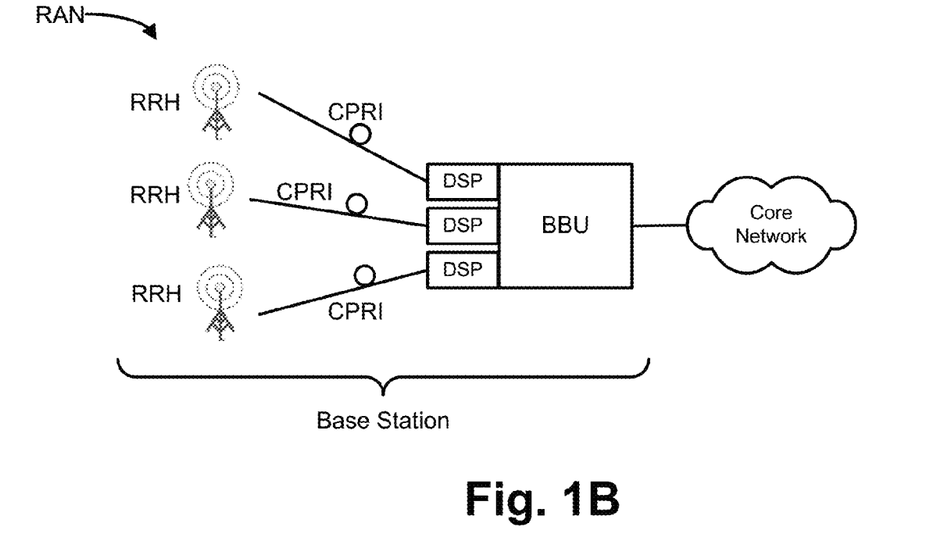
Figure 1C:
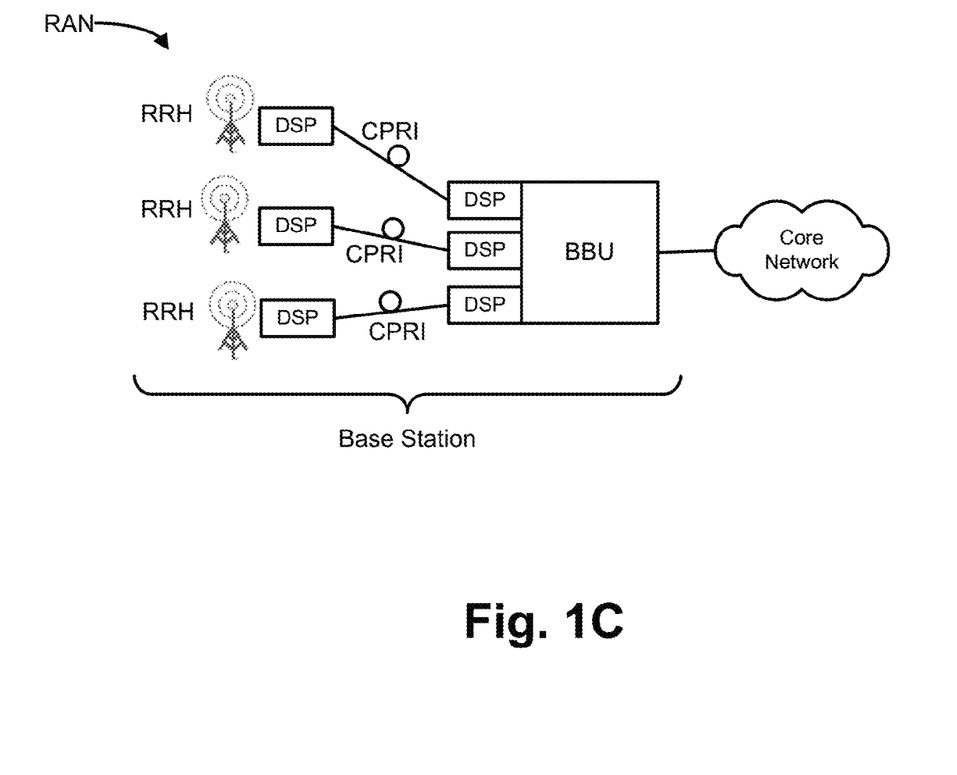

FIGS. 1A-1C are diagrams illustrating example overviews of concepts described herein. As illustrated in FIGS. 1A-1C, the RAN of a wireless network may include a base station, which may further include a BBU and one or more RRHs. The RRHs may each be connected to the BBU via a CPRI link (e.g., a CPRI link based on a fiber optic connection). The BBU may generally be responsible for baseband processing and connecting with a core portion of the wireless network. The RRHs may transmit and receive wireless signals using one or more antennas. Each RRH may convert the digital baseband signals, received from the BBU, into radio frequency (RF) signals. The RF signals may be wirelessly transmitted to or received from mobile devices (e.g., a mobile telephone).

The wireless transmission of the RF signals can be negatively affected by numerous environmental factors, such as interference from other RF sources, the distance of the mobile devices from an RRH, mobility of the mobile devices, and/or congestion of the RF interface. These factors may result in lost data and/or suboptimal utilization of the RAN.

As illustrated in FIG. 1A, consistent with aspects described herein, a DSP may be installed along the CPRI link, such as at the input of each of the RRHs. Alternatively or additionally, as illustrated in FIG. 1B, a DSP may be installed at each of the inputs of the BBUs (on the CPRI links). Alternatively or additionally, as illustrated in FIG. 1C, a DSP may be installed at both ends of the CPRI links.

The DSPs may analyze, measure, and/or filter (e.g., using digital filters and/or other digital signal processing techniques) the digital baseband signals to improve the performance of the RF interface of the RAN. In one implementation, the filters implemented by the DSPs may be programmed by a technician. Alternatively or additionally, the DSPs may analyze the digital baseband signals to dynamically determine appropriate digital filters to apply. Still further, based on the analysis of the digital baseband signals, the DSPs may provide analysis data to the BBU or to an analysis server. The analysis data may be used to implement the digital filters or the other digital signal processing techniques. In one implementation, analysis data from multiple DSPs, associated with multiple CPRI links, may be used to generate different digital filters that collectively operate to improve the overall performance of the RF interface of the RAN. Alternatively or additionally, the analysis data may be used in other ways, such as by being used to tune the antennas associated with the RRHs, to tune other parameters relating to the operation of the RRHs/BBUs (e.g., level 1 network parameters), and/or to optimize other parameters relating to the operation of the RRHs and/or BBU (or other network elements in the core network).

Figure 2:
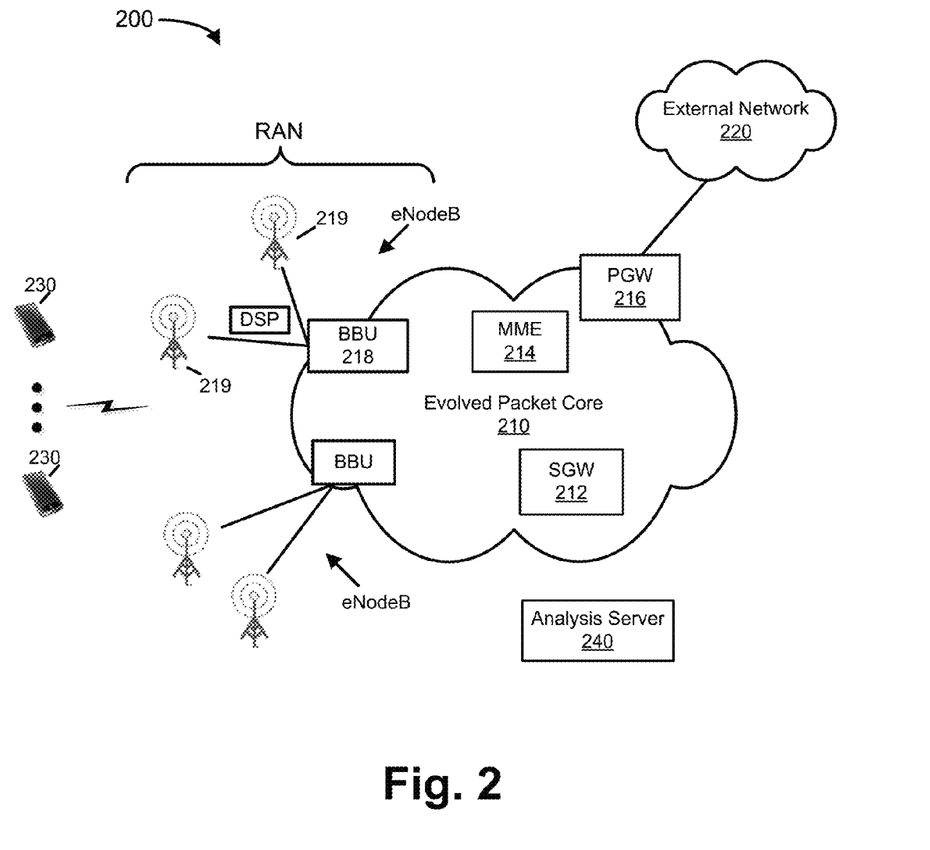
FIG. 2 is a diagram illustrating an example environment in which systems and/or methods described herein may be implemented.

FIG. 2 is a diagram illustrating an example environment 200 in which systems and/or methods described herein may be implemented. Environment 200 may generally relate to an implementation in a wireless network based on a Long Term Evolution (LTE) architecture.

As illustrated, environment 200 may include an evolved packet core 210, external network 220, mobile devices 230, and analysis server 240. Mobile devices 230 (often called "user equipment" in the context of an LTE network) may wirelessly connect to evolved packet core 210 through one or more base stations (often called "evolved NodeBs" or "eNodeBs" in the context of an LTE network) that communicate with evolved packet core 210. Each eNodeB may include a BBU 218 and one or more RRHs 219. As is further shown in FIG. 2, each eNodeB may include one or more DSPs associated with CPRI links between BBU 218 and RRHs 219. The DSPs, associated with an eNodeB, are illustrated in more detail with reference to FIGS. 3A-3C. In FIG. 2, one eNodeB is particularly labeled as including a BBU 218 and two RRHs 219.

Evolved packet core 210 may represent a wireless core network that operates based on a third generation partnership project ("3GPP") wireless communication standard. Evolved packet core 210 may include a RAN that includes one or more eNodeBs that connect to one or more network elements, such as serving gateway ("SGW") 212, mobility management entity device ("MME") 214, and a packet data network gateway ("PGW") 216.

SGW 212 may include one or more network devices that aggregate traffic received from one or more eNodeBs and may send the aggregated traffic to external network 220 via PGW 216. MME 214 may include one or more computation and communication devices that perform operations to register mobile devices 230 with evolved packet core 210 and to establish bearer channels associated with a session with mobile device 230, to handoff mobile device 230 from one eNodeB to another, and/or to perform other operations. PGW 216 may include one or more network devices, or other types of computation and communication devices, that act as an interface between evolved packet core 210 and other networks, such as external network 220.

An eNodeB, as illustrated in environment 200, may include a BBU 218 and one or more RRHs 219. RRHs 219 may be geographically separated from BBU 218. For example, BBU 218 may be installed within a building in a city. CPRI links (e.g., fiber links or other types of physical transport links) may connect BBU 218 to a number of RRHs 219, which may each be positioned at other locations in the city (e.g., at neighboring city blocks). As previously mentioned, BBU 218 may generally be responsible for baseband processing and connecting with a core portion of the wireless network. BBU 218 may receive packets from the core network, modulate the data corresponding to the packets to digital baseband signals, and transmit the digital baseband signals to an RRH 219. Similarly, digital baseband signals received from RRHs 219 may be demodulated, converted to packets, and transmitted to the core network. RRHs 219 may generally transmit and receive wireless signals, with mobile devices 230, using one or more antennas. Each RRH 219 may thus convert the digital baseband signals, received from the BBU, into radio frequency (RF) signals. An example of an eNodeB, including a BBU and three RRHs 219, is described in more detail below with reference to FIGS. 3A-3C.

External network 220 may include one or more wired and/or wireless networks. For example, external network 220 may include a packet data network (PDN), such as an Internet Protocol (IP)-based PDN. Mobile devices 230 may connect, through PGW 216, to data servers, application servers, or to other servers/applications that are coupled to external network 220.

Each of mobile devices 230 may include any computation and communication device, such as a wireless mobile communication device that is capable of communicating with an eNodeB. For example, mobile device 230 may include a radiotelephone; a personal communications system (PCS) terminal (e.g., a device that combines a cellular radiotelephone with data processing and data communications capabilities); a personal digital assistant (PDA) (e.g., that can include a radiotelephone, a pager, Internet/intranet access, etc.); a smart phone; a laptop computer; a tablet computer; a camera; a personal gaming system, or another type of mobile computation and communication device. Mobile device 230 may send traffic to and/or receive traffic from external network 220.

Analysis server 240 may include one or more server devices, or other types of devices, that receive data from DSPs associated with CPRI links between BBUs 218 and RRHs 219 of one or more eNodeBs. The received data may include frequency spectrums of digital baseband signals (i.e., frequency representations of the digital baseband signals in the frequency domain) processed by the DSPs, statistics (e.g., bandwidth, etc.) relating to the digital baseband signals, raw samples of the digital baseband signals, and/or other information. Analysis server 240 may aggregate and/or analyze the data. Based on the analysis, analysis server 240 may cause the DSPs to implement digital filters or other digital processing techniques to improve the performance of the RAN. Alternatively or additionally, and as previously mentioned, analysis server 240 may use other techniques to, based on the data received from the DSPs, improve the performance of the RAN (e.g., to tune antennas associated with the RRHs, to tune other parameters relating to the operation of the RRHs, etc.).

Although illustrated, in FIG. 2, as being outside of evolved packet core 210, analysis server 240 may be implemented as a device within evolved packet core 210, within an eNodeB (e.g., as logic within BBU 218), and/or as part of or connected to external network 220.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3A:
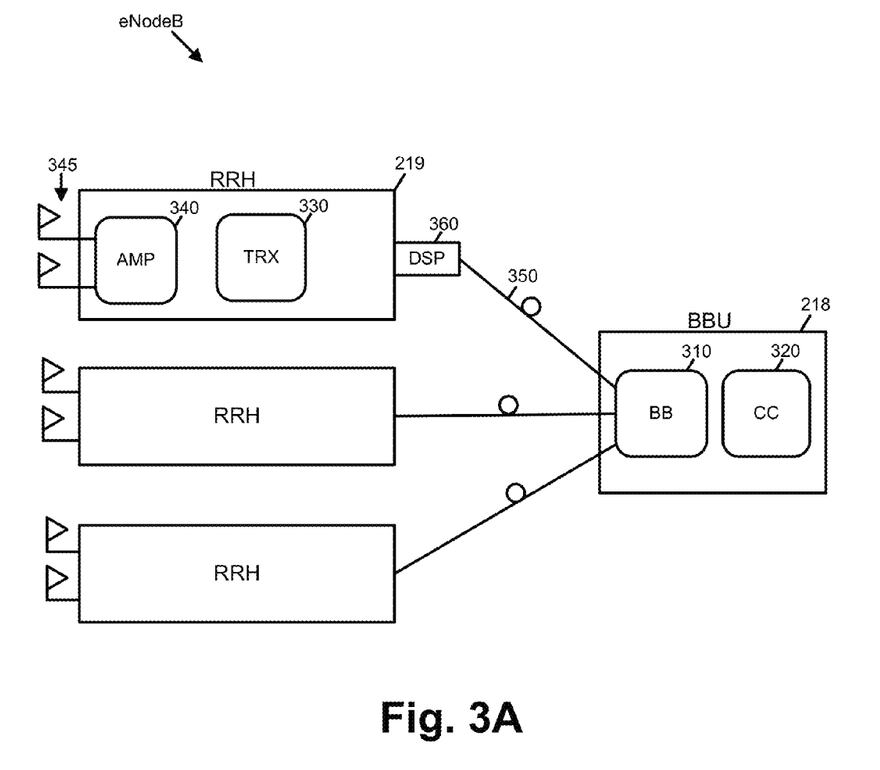
FIGS. 3A-3C is a diagram illustrating an example implementation of an eNodeB.
Figure 3B:
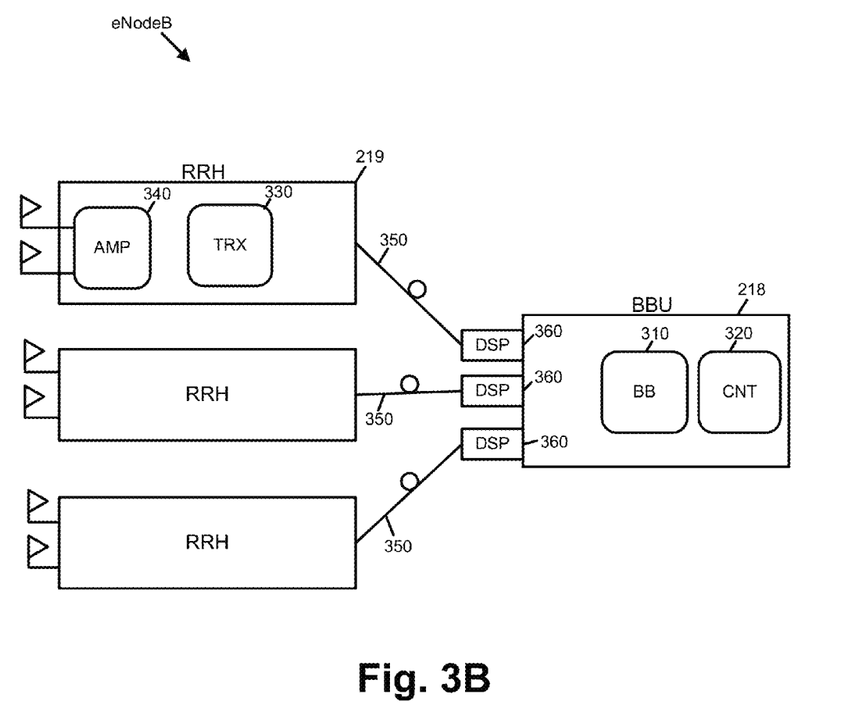
Figure 3C:
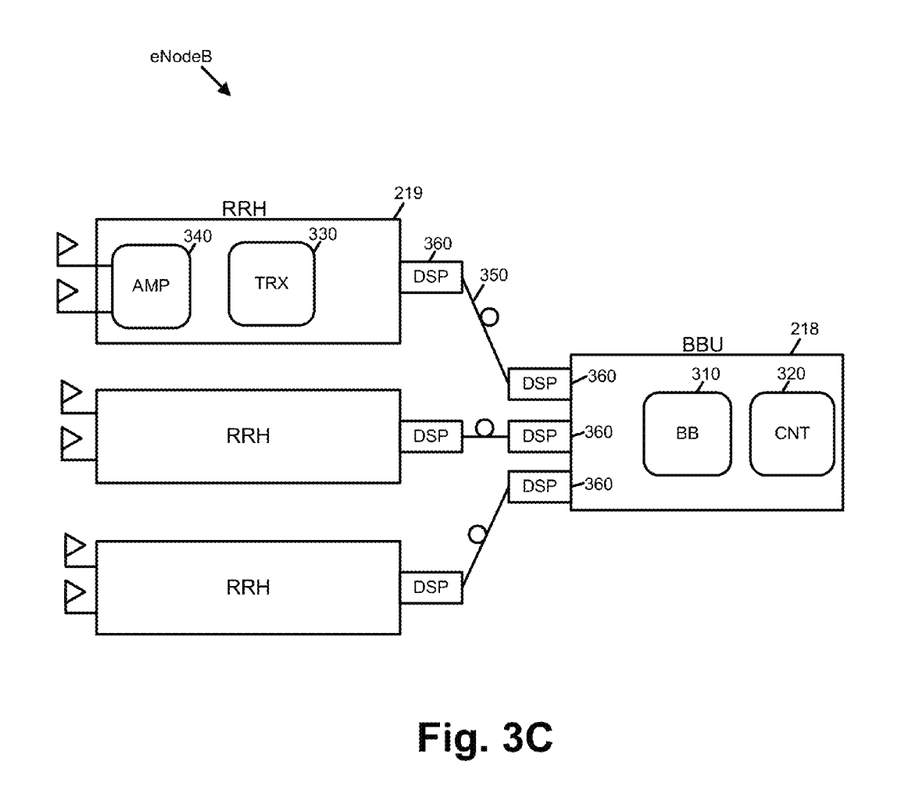

FIGS. 3A-3C are diagrams illustrating components of an eNodeB corresponding to various embodiments described herein.

As shown in FIG. 3A, an eNodeB may include BBU 218 and one or more RRHs 219. BBU 218 may be connected to each of RRHs 219 via a CPRI link 350. BBU 218 may include a baseband (BB) component 310 and core communication (CC) component 320. BB component 310 may provide digital baseband processing, such as processing relating to the conversion of packetized data, received by CC component 320, to digital baseband signals. BB component 310 may also convert digital baseband signals, received from an RRH 219, to packetized data. More generally, BB component 210 may perform protocol processing for the Radio Link Control (RLC) layer, Packet Data Convergence Protocol (PDCP) layer, Media Access Control (MAC) layer, and physical (PHY) network layer. The transmission techniques may include LTE-specific multiple-input multiple-output (MIMO), multilevel modulation, Orthogonal Frequency-Division Multiple Access (OFDMA) processing, and Single Carrier Frequency-division Multiple Access (SC-FDMA) processing. Other transmission protocols include Hybrid Automatic Repeat Request (H-ARQ), power control, and/or inter-cell interference control.

CC component 320 may, for example, perform IP layer protocol processing, call control processing, operations, administration and maintenance (OAM) processing, network address translation (NAT) processing, and other functions. CC component 320 may communicate with evolved packet core 210, such as with SGW 212, to communicate packet data. That is, CC component 320 may receive packet data from SGW 212 and forward the packet data to RRH 219. Similarly, CC component 320 may receive packet data from BB component 310 and forward the packet data to SGW 212.

RRH 219 may include transmission control (TRX) processing component 330, amplifier (AMP) 340, antennas 345, and DSP 360. TRX component 330 may perform functions relating to wireless signal processing, including distortion compensation processing, digital-to-analog conversion and analog-to-digital conversion of transmission signals. AMP 340 may perform amplification of the transmission power of the wireless signals transmitted over antennas 345. AMP 340 may also amplify wireless signals that are received from antennas 345.

DSP 360 may perform digital processing of the digital baseband signals received over CPRI link 350. DSP 360 may operate to measure, analyze, and/or filter, in the digital domain, the analog signals that are to be transmitted (or were received) using antennas 345. The operation of DSP 360 with respect to the measuring, analyzing, and filtering will be described in more detail below with reference to FIGS. 4-9.

DSP 360 may be physically implemented within RRH 219 or may be implemented as a separate component that may be installed external to RRH 219. For example, DSP 360 may be implemented as a device designed to be inserted in-line with a fiber-based CPRI interface (e.g., one port of DSP 360 may be inserted into a CPRI interface of RRH 219 and the fiber line to BBU 218 may be inserted into a second port of DSP 360). In this manner, DSP 360 may be installed separately from RRH 219. Control signaling (e.g., measurements or analysis data), associated with DSP 360, may be communicated using CPRI link 350, or may be communicated out-of-band relative to CPRI link 350 (e.g., DSP 360 may communicate with BBU 218 and/or analysis server 240 using another communication link).

FIG. 3B is a diagram illustrating components of an eNodeB corresponding to another implementation. The implementation of the eNodeB, as shown in FIG. 3B, is similar to that of FIG. 3A. In FIG. 3B, however, the measure, analyzing, and filtering of the digital baseband signals may be performed at BBU 218. As illustrated, BBU 218 may include or be associated with a DSP 360 for each CPRI link 350 to RRHs 219. As with DSP 360, as illustrated in FIG. 3A, DSP 360 may be implemented within BBU 218 or may be implemented as a separate component that may be installed external to BBU 218.

FIG. 3C is a diagram illustrating components of an eNodeB corresponding to another implementation. The implementation of the eNodeB, as shown in FIG. 3C, is similar to that of FIGS. 3A and 3B. In FIG. 3C, however, the measuring, analyzing, and filter of the digital baseband signals may be performed at both BBU 218 and RRHs 219. As illustrated, each end of CPRI link 350 may include a DSP 360.

Figure 4:
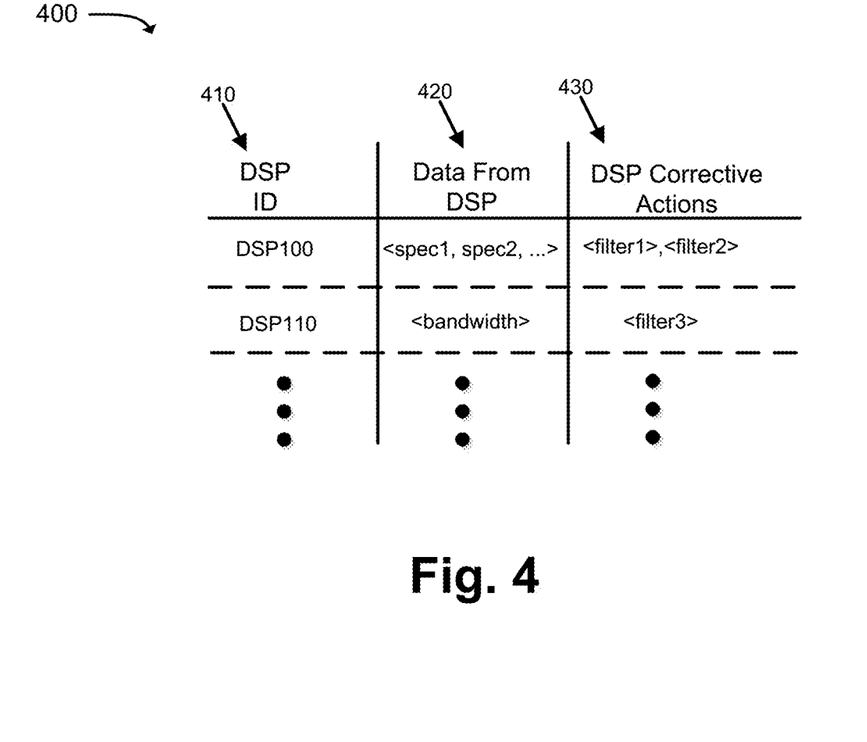
FIG. 4 is a diagram illustrating an example data structure.

FIG. 4 illustrates an example data structure 400 which may be stored by analysis server 240. Data structure 400 may be used by analysis server 240 to analyze measurements from a number of DSPs 360. Analysis server 240 may, for example, based on frequency spectra measurements associated with some or all of the DSPs 360 associated with a eNodeB, perform a correlation analysis, or other analysis to determine corrective actions that may optimize the overall RAN interface associated with the eNodeB. The fields shown for data structure 400 are examples. Data structure 400 may include fewer, additional, or different fields.

Data structure 400 may include DSP identification (ID) field 410, data from DSP field 420, and DSP corrective actions field 430. DSP identification field 410 may store a value that identifies a particular DSP 360. For example, DSP identification field 410 may store a hardware value associated with a particular DSP 360, a value associated with a particular RRH at which the DSP is installed, a value associated with a particular BBU at which DSP 360 is installed, and/or a value associated with a particular CPRI link 350 on which the DSP operates. Data from DSP field 420 may include data measured by the DSP identified in DSP identification field 410. For example, field 420 may include frequency spectra of the digital baseband data that is sampled by DSP 360 at various times, performance metrics relating to the digital baseband data (e.g., the bandwidth of the corresponding analog signal, etc.), or other data. DSP corrective actions field 430 may store an indication of any filters, or other mechanisms for corrective actions, that are implemented by or associated with the corresponding DSP identified in DSP identification field 410. For example, analysis server 240 may determine that a particular DSP 360 should implement a particular finite impulse response (FIR) filter. Parameters describing the filter may be stored in DSP corrective actions field 430.

Two example records are illustrated for data structure 400. The first record may be associated with the DSP labeled as "DSP100." For this DSP, data from DSP field 420 may store a number of frequency spectrum samples (e.g., the DSP may periodically record the frequency spectrum over a one second interval and transmit the spectrum to analysis server 240). DSP corrective actions field 430 may indicate the digital filters that are being applied by the DSP (e.g., "filter1" and "filter2"). The second record may be associated with the DSP labeled as "DSP110." For this DSP, data from DSP field 420 may store performance indicators relating to the digital baseband signal (e.g., the bandwidth). DSP corrective actions field 430 may indicate the digital filters that are being applied by the DSP (e.g., "filter3").

Figure 5:
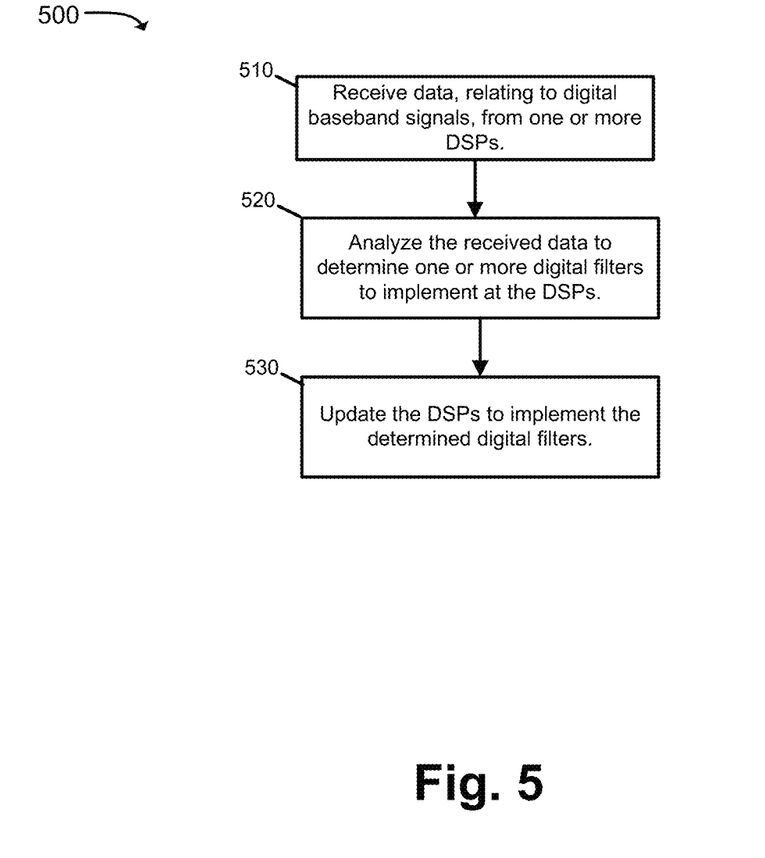
FIGS. 5-8 are flowcharts illustrating example processes relating to improving RAN performance using digital signal processors.

FIG. 5 is a flowchart illustrating an example of a process 500 relating to improving RAN performance using DSPs 360. Process 500 may be performed by, for example, analysis server 240. Alternatively or additionally, some or all of process 500 may be performed by BBU 218, RRHs 219, and/or DSPs 360.

Process 500 may include receiving data, relating to the digital baseband signals, from one or more DSPs (block 510). As previously mentioned, DSPs 360 may measure and/or sample the digital baseband signals corresponding to the CPRI link to which the DSPs are associated. For instance, a DSP 360 may occasionally or periodically calculate frequency spectrum for a particular sample of the digital baseband signal (e.g., a one second sample). Alternatively, DSP 360 may measure and/or calculate other metrics relating to the digital baseband signal, such as the bandwidth of the signal. DSP 360 may transmit the measured and/or calculated data to analysis server 240, which may store or otherwise maintain the data in a data structure, such as data structure 400.

Process 500 may further include analyzing the received data to determine one or more digital filters (or other digital signal processing techniques) to implement (block 520). In one implementation, analysis server 240 may determine digital filters to implement at a DSP on a per-DSP basis. For instance, analysis server 240 may analyze the data from a particular DSP 360 to determine one or more infinite impulse response (IIR) for FIR digital filters that may reduce the interference associated with the corresponding digital baseband signal. As one example, assume the radio signals received by a particular RRH 219 include interference in a particular frequency band associated with the signal. Analysis server 240 may identify the particular frequency band associated with the interference and determine a filter (e.g., a band-stop digital filter) appropriate for reducing the interference within the particular frequency band. In some situations, instead of analyzing the received data at analysis server 240, the analysis and determination of the digital filters may be done by DSP 360 or by the RRH 219 and/or BBU 218 and is associated with DSP 360.

In some implementations, the analysis performed (at block 520) may be an analysis performed based on data received from multiple DSPs 360. In this situation, the analysis may be performed based on the goal of improving the RAN performance at the eNodeB level (or higher level). For example, analysis server 240 may determine a number of digital filters, each associated with a particular DSP 360, to improve the overall throughput of the radio interface of the eNodeB. For instance, a filter at a particular DSP 360 may lower the performance of the RRH associated with the particular DSP 360 but may still be desirable if the filter, potentially in conjunction with other filters implemented by other DSPs 360, increase the performance enough to make up for the reduced performance caused by the filter associated with the particular DSP 360. In this situation, the analysis (at block 520) may include a correlation-based analysis in which the digital baseband signals, associated with multiple CPRI links, are correlated to determine common interference or noise conditions associated with different RRHs. In this case, the analysis may perform "interference hunting," in which interference, potentially from multiple interacting interference sources (in the RF domain). The interacting interference may be detected, by DSPs 360, and filters may be determined to reduce the overall interference.

Process 500 may further include updating the DSPs to implement the determined digital filters (or other digital signal processing techniques) (block 530). For example, analysis server 240 may transmit one or more messages to DSPs 360 to cause the DSPs to implement the determined digital filters.

Figure 6:
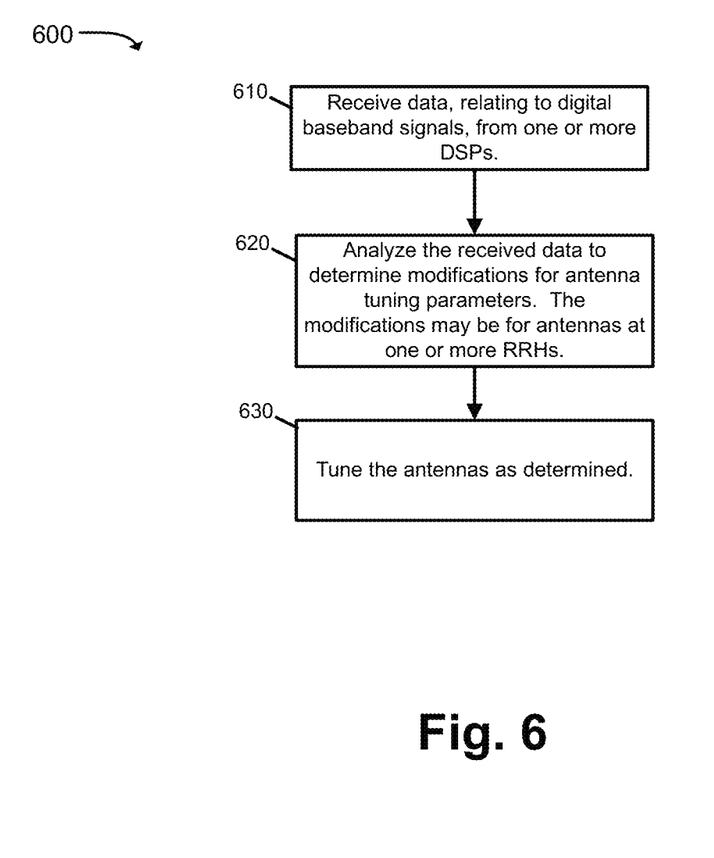

FIG. 6 is a flowchart illustrating an example of a process 600 relating to improving RAN by tuning antennas based on data received from DSPs. Process 600 may be performed by, for example, analysis server 240. Alternatively or additionally, some or all of process 600 be may performed by BBU 218, RRH 219, and/or DSPs 360.

Process 600 may include receiving data, relating to the digital baseband signals, from one or more DSPs (block 610). As previously mentioned, DSPs 360 may measure and/or sample the digital baseband signals corresponding to the CPRI link to which DSPs are associated. The reception of data, at block 610, may be similar to the reception of data performed at block 510 (FIG. 5).

Process 600 may further include analyzing the received data to determine modifications of antenna tuning parameters (block 620). The antenna tuning parameters may relate to electrical tuning of an antenna(s), connected to an RRH 219, to allow for, for example, adjustable orientation of the main antenna lobe in the vertical (tilt) and horizontal (azimuth) plane, as well as the width of the antenna lobe. Examples of parameters that may be tuned include antenna downtilt, azimuth, and beam width. In one implementation, analysis server 240 may determine antenna parameters to tune on a per-DSP basis or per-CPRI link basis. For instance, analysis server 240 may analyze the data from a particular DSP 360 to determine the antenna parameters to tune. The tuning may be based on a goal of maximizing a signal-to-noise (SNR) ration of the RF signals that are transmitted or received over the corresponding antenna.

In some implementations, the analysis performed (at block 620) may be an analysis performed based on data received from multiple DSPs 360. In this situation, the analysis may be performed based on the goal of simultaneously tuning multiple antennas to maximize the RAN performance.

Process 600 may further include tuning the antennas (block 630). For example, analysis server 240 may transmit one or more messages to RRHs 219, corresponding to the antennas that are to be tuned. The messages may include the values for the antenna parameters that are to be tuned and may cause RRHs 219 to adjust the antenna parameters. As previously mentioned, tuning of the antenna parameters may cause, for example, adjustments to the orientation of the antenna lobe in the vertical (tilt) and horizontal (azimuth) plane, as well as the width of the antenna lobe.

Figure 7:
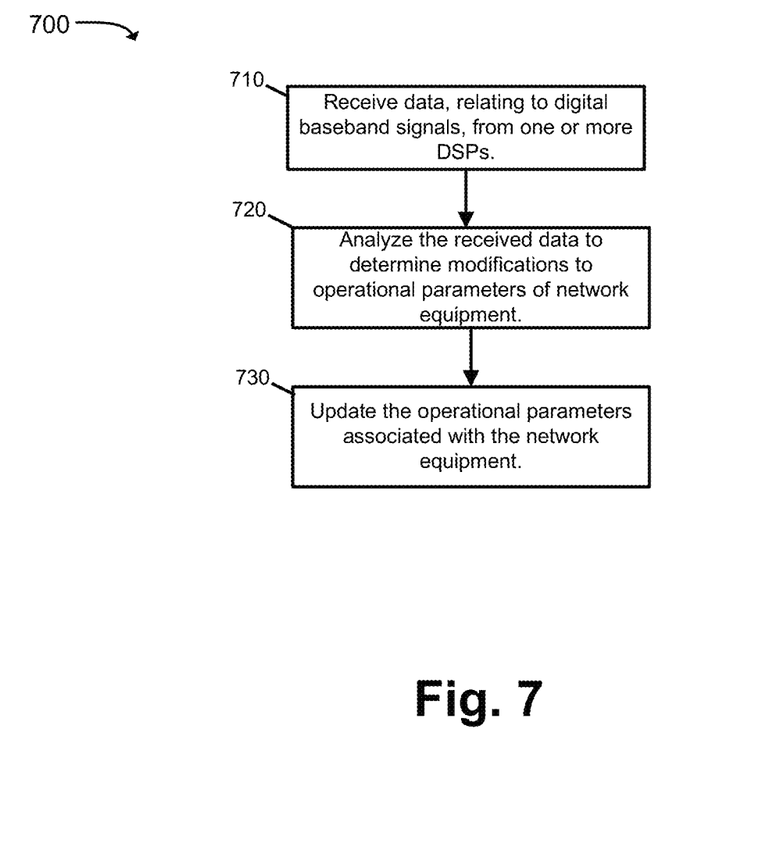

FIG. 7 is a flowchart illustrating an example of a process 700 relating to improving RAN performance by updating operational parameters associated with network equipment. Process 700 may be performed by, for example, analysis server 240. Alternatively or additionally, some or all of process 700 be may performed by BBU 218, RRH 219, and/or DSPs 360.

Process 700 may include receiving data, relating to the digital baseband signals, from one or more DSPs (block 710). As previously mentioned, DSPs 360 may measure and/or sample the digital baseband signals corresponding to the CPRI link to which the DSPs are associated. The reception of data, at block 710, may be similar to the reception of data performed at block 510 (FIG. 5).

Process 700 may further include analyzing the received data to determine modifications to operational parameters of network equipment (block 720). The operational parameters to modify may include Level 1 layer (physical layer) parameters in the Open Systems Interconnection (OSI) network model. The operational parameters may relate to, for example, operation of BBU 218 (e.g., operation of BB component 310 and/or CC component 320) and/or operation of RRH 219 (e.g., operation of TRX component 330 and/or AMP 340). In one implementation, analysis server 240 may determine the operational parameters to modify on a per-DSP basis or per-CPRI link basis. For instance, analysis server 240 may analyze the data from a particular DSP 360 to determine the operational parameters to modify. The modification of the operational parameters may be based on a goal of maximizing a signal-to-noise (SNR) ratio of the RF signals that are transmitted or received over the corresponding antenna.

In some implementations, the analysis performed (at block 720) may be an analysis performed based on data received from multiple DSPs 360. In this situation, the analysis may be performed based on the goal of simultaneously tuning multiple operational parameters to maximize the RAN performance.

Process 700 may further include updating the operation parameters associated with the network equipment (block 730). For example, analysis server 240 may transmit one or more messages to BBU 218, RRH 219, or other network equipment. The messages may include updated values for the operation parameters that are to be modified and may the network equipment to adjust the operational parameters.

In some implementations, process 500, 600, and 700 may be executed iteratively. That is, analysis server 240 may generate digital filters, adjust antenna parameters, and/or adjust operation parameters of network equipment, respectively, and then observe the effect of the operation on the received data (e.g., blocks 610, 710, or 810). Analysis server 240 may continue to perform adjustments to further optimize performance of the RAN. In some implementations, all or some of processes 500, 600, and 700 may be performed at the same time, and/or the parameters relating to the various processes may be determined in conjunction with one another.

Figure 8:
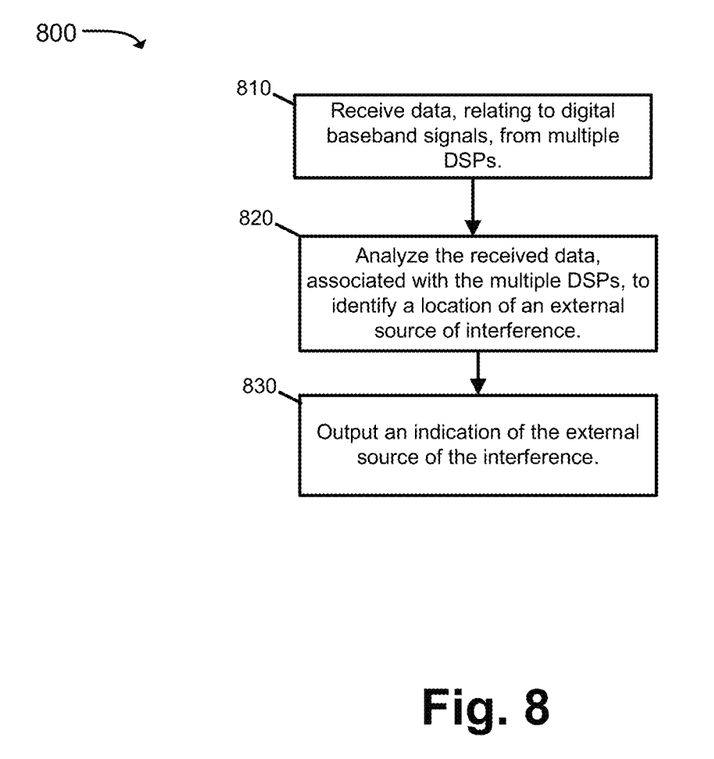

FIG. 8 is a flowchart illustrating an example of a process 800 relating to identification of external sources of interference. Process 800 may be performed by, for example, analysis server 240.

Process 800 may include receiving data, relating to the digital baseband signals, from multiple DSPs (block 810). As previously mentioned, DSPs 360 may measure and/or sample the digital baseband signals corresponding to the CPRI link to which the DSPs are associated. The reception of data, at block 810, may be similar to the reception of data performed at block 510 (FIG. 5).

Process 800 may further include analyzing the received data, associated with the multiple DSPs, to identify a location of an external source of interference (block 820). In one implementation, the identification of the external source of interference may include identifying a physical location or area of the external source of interference. For example, frequency spectrum samples from a number of DSPs 360 may indicate that there is common interference source associated with each of the DSPs. A common interference source may include, for example, an electronic device or radio, that through malfunction (or for another reason) is generating radio interference in the frequency range used by RRHs 219. The magnitude of the interference may be different in the frequency spectra for each of the multiple DSPs 360. Because the location of the antenna associated with each DSP 360 may be known, analysis server 240 may use triangulation techniques, or other techniques, to estimate the physical location of the external source of interference.

Process 800 may further include outputting an indication of the external source of the interference (block 830). For example, analysis server 230 may inform an operator, or other user, of the detected interference source. The operator may investigate the source of the interference, such as by traveling to the indicated location to determine what is causing the interference.

Figure 9:
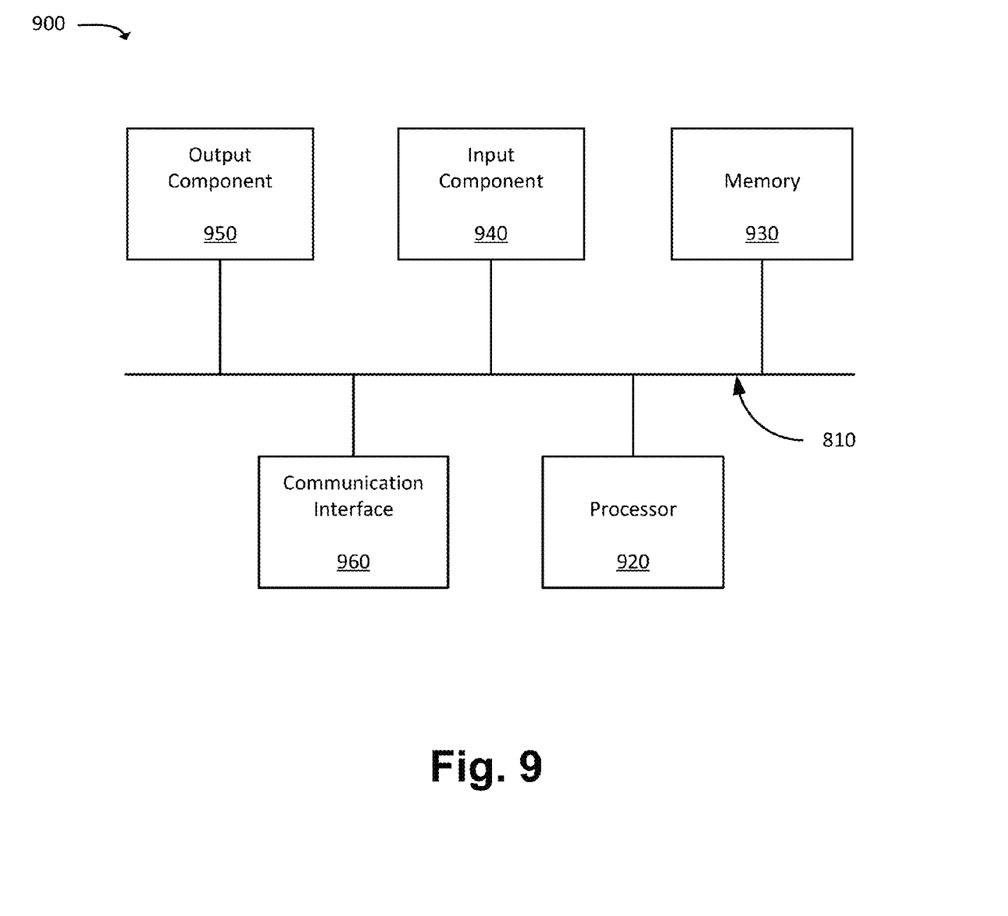
FIG. 9 is a diagram of example components of a device.

FIG. 9 is a diagram of example components of device 900. One or more of the devices described above (e.g., with respect to illustrated in FIGS. 1A-1C, 2, and/or 3A-3C) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks has been described with regard to FIGS. 5-8, the order of the blocks may be modified in other implementations. Further, non-dependent blocks may be performed in parallel.

Additionally, while an example of a data structure is illustrated in FIG. 4 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
receiving, by one or more devices, data relating to a plurality of digital baseband signals that were transmitted over a plurality of common public radio interface (CPRI) links between a respective plurality of remote radio heads (RRHs) and a baseband unit (BBU) in a radio access network (RAN) of a wireless network, the data, for each of the CPRI links, having been generated by one or more digital signal processors (DSP) associated with each of the plurality of the CPRI links;
analyzing, by the one or more devices, the received data to determine a plurality of parameters, associated with a plurality of network elements in the RAN, to improve an overall performance of radio frequency communications of the RAN; and
updating, by one or more devices, the plurality of network elements to cause the plurality of network elements to operate based on the determined plurality of parameters.

2. The method of claim 1, wherein the received data includes a frequency representation of the digital baseband signals in the frequency domain.

3. The method of claim 1, wherein the analyzing the received data to determine the plurality of parameters includes:
analyzing the received data to determine the plurality of parameters as parameters defining digital filters that are to be implemented by the DSPs,
wherein updating the plurality of network elements includes causing the DSPs to filter the plurality of digital baseband signals using the determined digital filters.

4. The method of claim 1, wherein the analyzing the received data to determine the plurality of parameters includes:
analyzing the received data to determine the plurality of parameters as parameters relating to antenna tuning for antennas associated with the RRHs,
wherein updating the plurality of network elements includes updating the antennas associated with the RRHs to implement the determined plurality of parameters.

5. The method of claim 1, wherein the analyzing the received data to determine the plurality of parameters includes:
analyzing the received data to determine operational parameters of network equipment associated with the RRHs or the BBU,
wherein updating the plurality of network elements includes implementing the operational parameters at the RRHs or the BBU.

6. The method of claim 5, wherein the operational parameters include Level 1 parameters in the Open Systems Interconnection (OSI) network model.

7. The method of claim 1, wherein the analyzing the received data to determine the corrective measures includes:
analyzing the received data to identify a physical location of an external source of interference.

8. An analysis server comprising:
a non-transitory memory device storing a set of computer-executable instructions; and
one or more processors configured to execute the computer-executable instructions, wherein executing the computer-executable instructions causes the one or more processors to:
receive data relating to a plurality of digital baseband signals that were transmitted over a plurality of common public radio interface (CPRI) links between a respective plurality of remote radio heads (RRHs) and a baseband unit (BBU) in a radio access network (RAN) of a wireless network, the data, for each of the CPRI links, having been generated by one or more digital signal processors (DSPs) associated with each of the plurality of the CPRI links;
analyze the received data to determine a plurality of parameters, associated with a plurality of network elements in the RAN, to improve an overall performance of radio frequency communications of the RAN; and
update the network elements to cause the network elements to operate based on the determined plurality of parameters.

9. The analysis server of claim 8, wherein the received data includes a frequency representation of the digital baseband signals in the frequency domain.

10. The analysis server of claim 8, wherein, when analyzing the received data to determine the plurality of parameters, the computer-executable instructions further include instructions to:
analyze the received data to determine the plurality of parameters as parameters defining digital filters that are to be implemented by the DSPs,
wherein the update of the plurality of network elements includes causing the DSPs to filter the plurality of digital baseband signals using the determined digital filters.

11. The analysis server of claim 8, wherein, when analyzing the received data to determine the plurality of parameters, the computer-executable instructions further include instructions to:
analyze the received data to determine the plurality of parameters as parameters relating to antenna tuning for antennas associated with the RRHs,
wherein the update of the plurality of network elements includes updating the antennas associated with the RRHs to implement the determined plurality of parameters.

12. The analysis server of claim 8, wherein, when analyzing the received data to determine the plurality of parameters, the computer-executable instructions further include instructions to:
analyze the received data to determine operational parameters of network equipment associated with the RRHs or the BBU,
wherein the update to the plurality of network elements includes implementing the operational parameters at the RRHs or the BBUs.

13. The analysis server of claim 12, wherein the operational parameters include Level 1 parameters in the Open Systems Interconnection (OSI) network model.

14. The analysis server of claim 8, wherein, when analyzing the received data to determine the one or more parameters, the computer-executable instructions further include instructions to:

analyze the received data to identify a physical location of an external source of interference.

15. A system comprising:
a plurality of remote radio heads (RRHs) to wirelessly communicate, via radio frequency signals, with one or more mobile devices;
a baseband unit (BBU) connected to each of the RRHs by a respective one of a plurality of common public radio interface (CPRI) links, the BBU configured to communicate with a core portion of a wireless network;
an analysis device; and
a plurality of digital signal processors (DSPs), respectively connected between each of the RRHs and the BBU, each of the DSPs configured to:
analyze digital baseband signals transmitted, via the respective CPRI link, between the RRH and the BBU,
transmit data, relating to the analysis of the digital baseband signals, to the analysis device,
receive, from the analysis device, an indication of one or more digital filters to implement, to improve performance of the wireless communications with the one or more mobile devices, and
process the digital baseband signals using the indicated one or more digital filters.

16. The system of claim 15, wherein the CPRI link includes a fiber optic link.

17. The system of claim 15, wherein each of the DSPs is attached to an output of the RRH.

18. The system of claim 15, wherein each of the DSPs is attached to an output of the BBU.

19. The system of claim 15, wherein the wireless network includes a Long Term Evolution (LTE) network and the RRH, BBU, and DSP are implemented within an eNodeB of the LTE network.

20. The system of claim 15, wherein the analysis device includes an analysis server located externally to the RRHs and the BBU.

* * * * *